Feb. 16, 1971 D. S. EVANS 3,564,540

ELECTRICAL DIGITAL SCALE

Filed Aug. 27, 1969 3 Sheets-Sheet 1

Feb. 16, 1971 D. S. EVANS 3,564,540

ELECTRICAL DIGITAL SCALE

Filed Aug. 27, 1969 3 Sheets-Sheet 3

United States Patent Office 3,564,540
Patented Feb. 16, 1971

3,564,540
ELECTRICAL DIGITAL SCALE
David S. Evans, Kent, England, assignor to Moore Reed (Industrial) Ltd., Walworth, Andover, Hampshire, England, a corporation of the United Kingdom
Continuation-in-part of application Ser. No. 554,573, June 1, 1966. This application Aug. 27, 1969, Ser. No. 853,276
Int. Cl. G08c 9/08
U.S. Cl. 340—347 4 Claims

ABSTRACT OF THE DISCLOSURE

In order to produce an unambiguous read-out of a scale when a plurality of at least three contacts are simultaneously connected with a brush, the invention employs an arrangement of earthed logic elements, one for each contact of the scale and inhibited, on the one hand, by any of a plurality ($n-1$) of input signals constituted by the output signals of the logic elements of the next higher or lower contacts, which can be simultaneously connected with the brush, as the case may be, and, on the other hand, by an input signal being an inhibiting signal fed through a line connecting the logic element concerned with its contact, so that when the logic element is earthed, it will produce an output signal only if the logic element at least one of the said next higher or lower contacts, as the case may be, is not producing an output signal. As a result when three or more contacts are simultaneously connected with a brush, the logic element of one must necessarily produce an output signal and thus inhibit the logic elements of the other contacts.

The present application is a continuation-in-part of application Ser. No. 554,573 filed June 1, 1966 of David Silvester Evans, now abandoned.

In this specification the terms "contact" and "brush" will be used, the operative association of a "contact" and a "brush" being referred to as "connection." The meaning of such terms, with reference to electric circuits, is well-known, but these terms will be used herein to refer also to other equivalent arrangements. Examples of such equivalents are optical, pneumatic, hydraulic and, particularly, to magnetic arrangements such as those wherein a discrete area of a material in a certain magnetic state corresponds to a "contact" and a sensor, corresponding to a "brush," is provided to obtain one or other of two signals (one of which may correspond to a state of no signal), according as the sensor is or is not operatively coupled ("connected") to such a discrete area of the material.

Methods hereto used to avoid ambiguities in machine reading of scales have employed either double brush choosing methods or unit distance cyclic codes. A choosing system preserves the normal order of coding of the scale but requires double the number of brushes used in a corresponding cyclic system. Cyclic permutations are unambiguous but require complicated decoding. The resolution of both systems is limited by the smallest practical contact length; to that length in the case of a choosing system, and to half that length in a cyclic system. Furthermore, allowance has to be made for the length of the brush in both systems.

In the present invention, scale contacts are arranged in such a way as to make use of make-before-break or overlapping techniques, without producing ambiguities. Single edge detection is used, wherein either the leading or trailing edges of the contacts are significant, but not both. Contacts can be made longer than the scale divisions they represent or the brushes can be longer than the scale divisions. The invention is applicable to linear and to non-linear scales of any radix.

An overlap system arranged according to the invention, in a priority system wherein the high digit, of those connected to the brush, takes over and inhibits the lesser digits; or vice versa, as desired. The extent of inhibition depends on the maximum allowable overlap in a particular system. The system lends itself to the production of simple uncoded single or multiple track scales, weighted cyclic scales and high resolution scales of small size. These and other advantages will be made clear by the following description of typical embodiments, referring to the accompanying drawings, in which.

Figure 1:
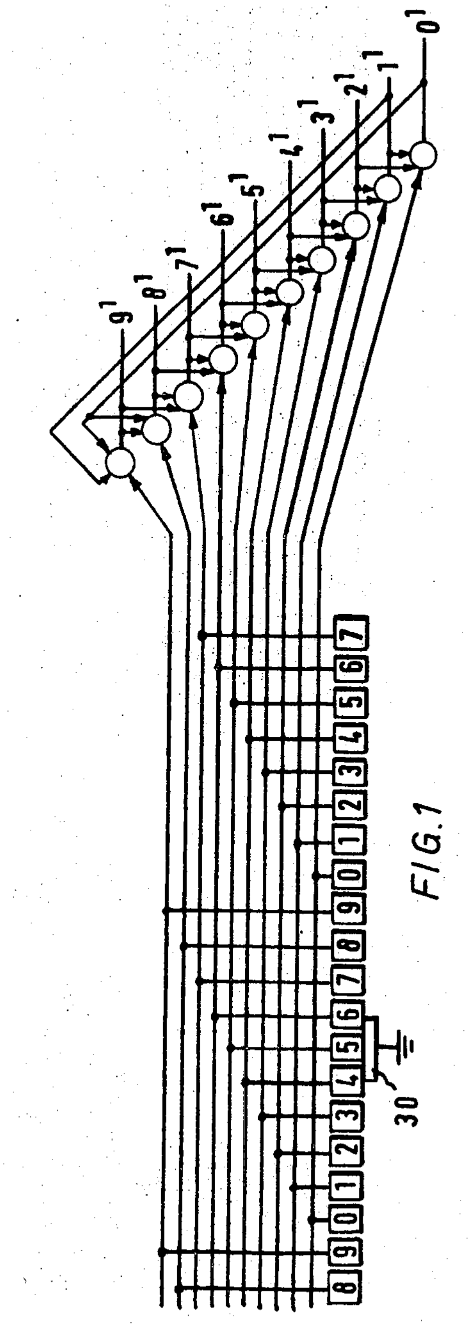
FIG. 1 illustrates how the inhibiting logic is made to respond, when the brush connects with more than two contacts at once.

In FIG. 1 the numbered scale segments represent contacts and all contacts having like numbers are connected together; since the scale is a decimal scale there are ten outputs identified by the numerals 0' to 9'. The detector is a brush 30 which is broader than the insulation space between the contacts and therefore makes contact with three adjacent contacts before breaking connection with the contact being read; the adjacent contacts are thus shorted together during movement of the brush. The brush is shown earthed, but it could be at some other potential; in the example illustrated at least two and sometimes three adjacent output lines exhibit an earth condition.

The elements shown as circles to the right of the diagram are transistor NOR logic elements, there being one for each contact of the given scale. In this case they are all assumed normally to be biased into the conducting state, by a negative bias current through each input line connected to the scale contacts. Earthing of such an input, e.g., of contact 6, on reading removes the negative bias and, if either or both of the further inputs from the collectors of the two preceding logic elements, i.e., of contacts 5 and 4 are also at earth potential, the transistor will switch off, producing a negative potential at its collector which is the required signal.

Any transistor which is so cut off will produce a negative signal current into the base of the immediately preceding transistor, making that transistor conduct whether it is subjected to an earth condition from the scale or not. In other words, the signal from the corresponding contact is effectively inhibited. It will be seen that this is progressive ring arrangement wherein the higher of two digits takes over from the lower. On reversing direction the dominating contact retails priority until the brush finally loses contact with it, in which case the next higher contact takes control.

An advantage of the above arrangement is that should bounce or ineffective connection take place between one of the dominated contacts and the brush, ambiguity is still avoided since the dominating contact will still be the only one to produce the output signal.

Figure 2:
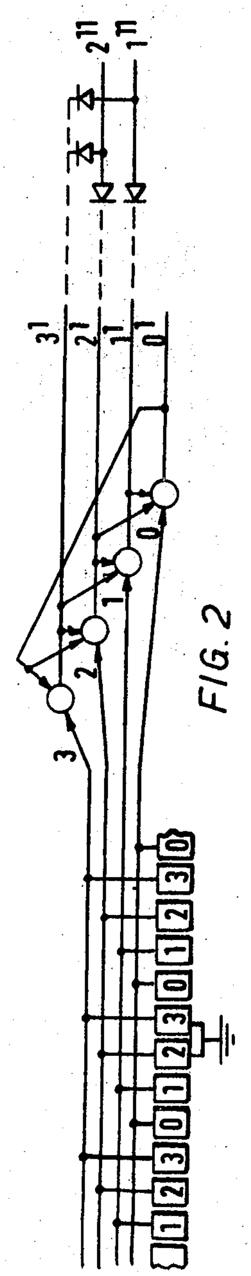
FIG. 2 shows a binary equivalent of the arrangement of FIG. 1.

FIG. 2 shows a binary or quadruple decimal equivalent of the decimal arrangement shown in FIG. 1. In this case the repeat is every four, so that the total scale length would be a multiple of four, that is a power of two. By the addition of diode logic the output can be encoded to binary as illustrated at 1'' and 2''. The repeat could, of course, be to some other base, for example octal.

Figures 3, 4, 5, 6:
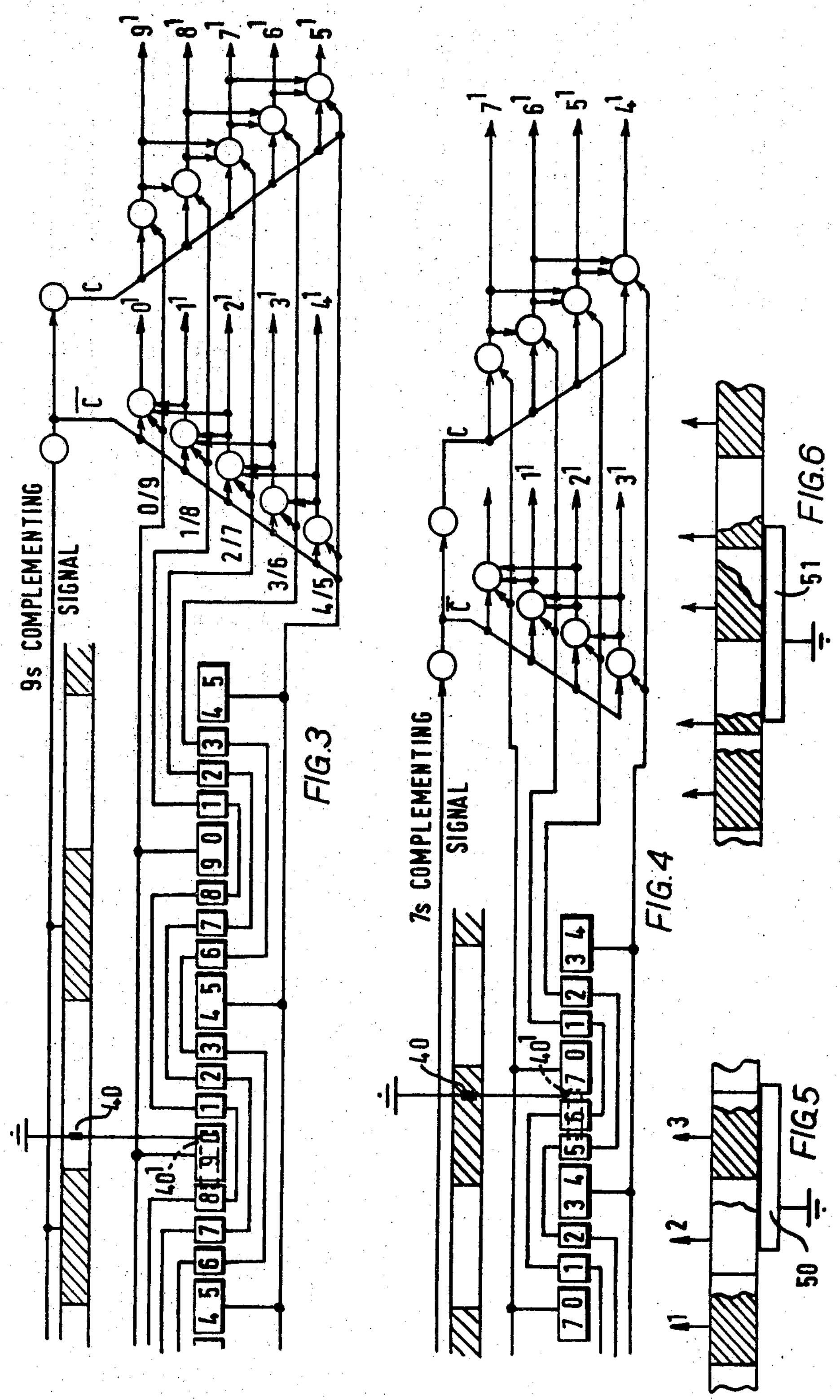
FIG. 3 illustrates a bi-quinary or cyclic decimal arrangement for six line transmission.
FIG. 4 shows an octal equivalent of FIG. 3.
FIG. 5 illustrates how an accurate reading can be made with contacts having inaccurate trailing edges.
FIG. 6 is similar to FIG. 5 but has a longer brush.

FIG. 3 illustrates a method of reducing the number of output lines in a decimal system, by complementing the digits 0 to 4 and 9 and 5. This complementary cyclic arrangement also enables the contacts to be interconnected by means of printed circuit techniques. It should be noted that the logic system differs from that already described in that group inhibition, controlled from the complementary track via interconnected brushes 40 and 40', has been added. The system is only slightly more complicated than the straight decimal system and requires no decoding other than by complementing. It should also be noted that reversal of the complementing signals C and C reverses the order of readout from the scale.

In the arrangement of FIG. 3 the touch-tag system only applies to the main track of the scale, since both edges of the complementing contacts decide changeovers, i.e. 9 to 0 or 4 to 5. These edges must, therefore, be well defined, but this is not usually difficult since the contacts are five divisions along. An overlap system can be introduced, if desired and if the additional complication is considered worthwhile.

FIG. 4 shows an octal equivalent of the arrangement of FIG. 3 the mode of operation will be evident from what has been said regarding FIG. 3.

FIGS. 5 and 6 illustrate the wide tolerance in contact length that can be accepted, with long brush arrangements, 50 and 51 respectively, without affecting uniform and continuous readout.

Figure 7:
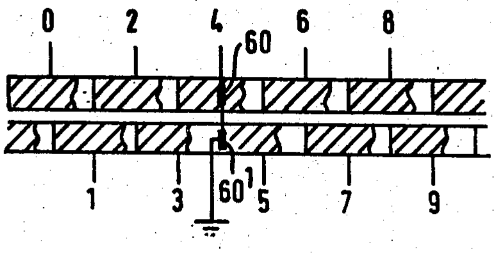
FIG. 7 illustrates a two-track arrangement providing overlap of contacts.
Figure 8:
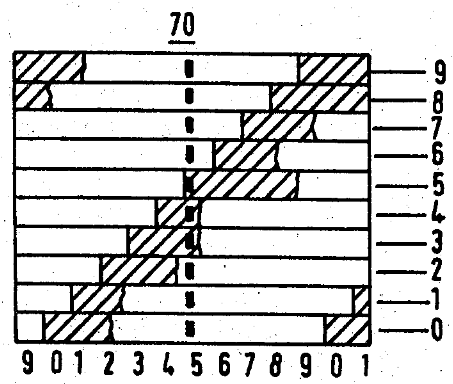
FIG. 8 illustrates a multitrack arrangement for providing overlap of contacts, wherein either the brushes or the contacts can be connected together in common.
Figure 9:
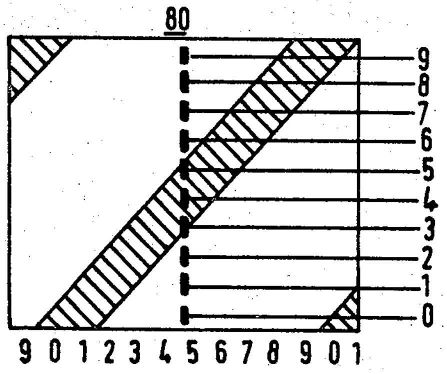
FIG. 9 is an upstepped variant of FIG. 8, using separate brushes.

FIG. 7 shows how contacts can be made to overlap, in a touch-tag system, by using two tracks instead of one, together with an interconnected part of brushes 60 and 60'. FIGS. 8 and 9 illustrate extensions of this principle to ten tracks. It should be noted that in FIG. 8 it is optional whether the tracks 0 to 9 or the brushes 70 are connected in common: In FIG. 9, however, the contacts are in common, the tracks 0 to 9 being taken from the corresponding ones of the brushes 80.

Figure 10:
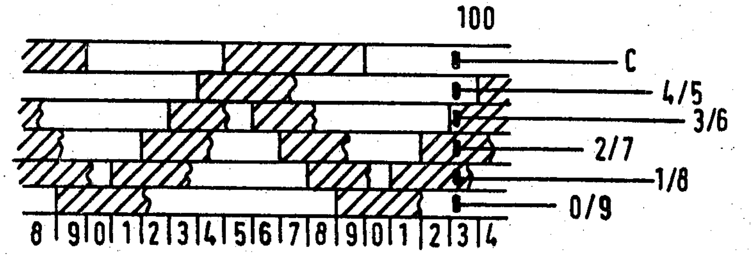
FIG. 10 illustrates a multitrack arrangement corresponding to FIG. 3.

FIG. 10 shows a multi-track equivalent of the arrangement of FIG. 3, permitting the use of longer contacts for the same resolution. It is also useful where the brushes 10' are required to remain stationary whilst the contact system rotates.

I claim:

1. A scale reading system of the kind in which a series of contact members representing a range of scale values and a connecting means therefor are moved relatively to connect said means and the contact member of the scale value to be read, wherein the connecting means are such that in moving relatively to the contact members, connection is made simultaneously with a plurality $n$ of at least three contact members, and wherein An arrangement of logic elements is associated with with the series of contact members, one element for each contact member, each element having:

(a) an output for producing an output signal when its associated contact member is connected to the connecting means unless the element is inhibited, (b) a first input for receiving a first inhibiting signal, said first input connected to its respectively associated contact member so that on connection of the contact member with said connecting means, the inhibiting signal is removed, and (c) a plurality $(n-1)$ of further inputs to receive further inhibiting signals, the further inputs being connected respectively to the plurality $(n-1)$ outputs of said $n-1$ elements next following in one direction of reading of the scale so that the logic element of the contact member which is the leading contact member of the contact members connected at any one time with the connecting means in a reading of the scale in said direction, necessarily inhibits the logic elements of the remaining contact members connected at that time with the connecting means.

2. The scale reading system as claimed in claim 1, wherein the contact members are constituted by planar contacts and the connecting means by a brush to engage with the contacts.

3. The scale reading system as claimed in claim 1, wherein the contact members are constituted by a plurality of aligned brushes and the connecting means by a planar contact band arranged to be on a line diagonal to the line of the brushes.

4. The scale reading system as claimed in claim 1, comprising two of the series of contact members to represent complementary parts of a scale denomination with the contact members of each series of a like position in the part denomination connected together; and a further separate contact and brush combination arranged to inhibit the logic elements of each of the series alternately, whereby the logic element of only one of two like positioned contact members can produce an output at any one time.

References Cited

UNITED STATES PATENTS

| | | | |
|---|---|---|---|
| 2,972,740 | 2/1961 | Lahti | 340—347 |
| 3,149,322 | 9/1964 | Wheeler | 340—347 |

MAYNARD R. WILBUR, Primary Examiner

M. K. WOLENSKY, Assistant Examiner